(12) United States Patent
Tittlemier et al.

(10) Patent No.: US 11,396,622 B1
(45) Date of Patent: Jul. 26, 2022

(54) PRODUCTION OF HYDROCARBONS FROM BRINE CONTAINING HYDROCARBON SUBSTANCES

(71) Applicant: MSSK Consulting LLC, Vail, AZ (US)

(72) Inventors: Troy Randall Tittlemier, Vail, AZ (US); Stanley Bush Keith, Sonoita, AZ (US)

(*) Notice: Subject to any disclaimer, the term of this patent is extended or adjusted under 35 U.S.C. 154(b) by 0 days.

(21) Appl. No.: 17/673,767

(22) Filed: Feb. 16, 2022

(51) Int. Cl.
*C09K 8/58* (2006.01)
*E21B 43/16* (2006.01)

(52) U.S. Cl.
CPC .............. *C09K 8/58* (2013.01); *E21B 43/16* (2013.01)

(58) Field of Classification Search
CPC ...................................................... C09K 8/58
See application file for complete search history.

(56) References Cited

U.S. PATENT DOCUMENTS 10,190,063 B2 * 1/2019 De Wet ............... C10G 65/12
2015/0247381 A1 * 9/2015 Pursley ................. C09K 8/52
166/304

* cited by examiner

*Primary Examiner* — Angela M DiTrani Leff
*Assistant Examiner* — Avi T Skaist (57) ABSTRACT

The invention discloses a system and method of producing hydrocarbons from brine. The brine is obtained from a subterranean source and contains carbon substances that may otherwise be difficult or inefficient to conventionally utilize. A mechanical energy is delivered to the brine to energize and rearrange the intermolecular hydrogen bonds in the brine's water molecules. A first and second borehole are selected, each connected to the same subterranean reservoir that permits flow between the boreholes. Brine is introduced into the first borehole, and into the subterranean reservoir. A hydrocarbon-enriched, and more alkane enriched liquid is extracted from, and transported away from the second borehole, and to the surface.

18 Claims, 5 Drawing Sheets

| Sample description | LIGHT n-Alkanes n-C10 to n-C15 (parts per thousand) | LIGHT n-Alkanes n-C16 to n-C19 (includes pristane & phytane) (parts per thousand) | INTERMEDIATE n-Alkanes n-C20 to n-C26 (parts per thousand) | INTERMEDIATE n-Alkanes n-C27 to n-C34 (parts per thousand) | HEAVY n-Alkanes n-C35 to n-C44 (parts per thousand) | Total n-alkanes (parts per thousand) | Adamantane (parts per thousand) | Total Diamonoids (parts per thousand) | Total PAH's (parts per thousand) | Total aromatic (parts per thousand) |
|---|---|---|---|---|---|---|---|---|---|---|
| Existing Reservoir Oil | 28.13 | 10.14 | 5.44 | 2.88 | 1.21 | 94.39 | 0.031 | 2.09 | 0.22 | 6.73 |
| Extraction During Operation of System | 32.52 | 11.99 | 6.30 | 3.14 | 1.41 | 100.93 | 0.044 | 1.96 | 0.11 | 5.16 |
| Percent Increase | 116% | 118% | 116% | 109% | 117% | 116% | 142% | 94% | 50% | 23% |

PRODUCTION OF HYDROCARBONS FROM BRINE CONTAINING HYDROCARBON SUBSTANCES

BACKGROUND

A major problem in the energy industry is the economic and environmentally safe extraction of hydrocarbons from subterranean reserves. Hydrocarbons used in the energy industry may be present in various physical forms including as a liquid, a gas, or a solid. The most widely used and valuable hydrocarbon is liquid oil. Certain types of liquid oil may be more valuable than others based on the hydrocarbon composition. For example, a "light," alkylated, hydrogenated oil is typically preferred because it is easier to refine into usable products such as gasoline. An extensive infrastructure exists in many parts of the world for the treatment of oil and the transportation of the resulting refined goods, such as gasoline.

The extraction process of liquid oil can also be costly and environmentally damaging. For example, significant brines are a byproduct, and are considered to be an environmental liability. Brine contains salts so it cannot be used for agricultural purposes. Additionally, it cannot be disposed of at ground level because it will cause significant changes to the surrounding environment, e.g., destruction of flora and fauna, and facility corrosion, etc. Further, treatment can be costly because of other substances in the brine that may be environmentally hazardous, including residual hydrocarbons or other non-salt minerals such as kerogen. Extensive treatment of brine is required to sufficiently remove the hazardous substances before it can be usable for agriculture. Conventionally, it is difficult and costly to treat subterranean brine for use in other industries. For example, brine waste is particularly problematic in the Permian Basin oil field, where an estimated four barrels of brine are produced for every barrel of oil. Some operators inject brine back into subterranean formations. However, this injection can cause adverse seismic activity affecting residents and businesses. See HOUSTON CHRONICLE, Paul Takahashi, *Permian Basin was hit by a record number of earthquakes last year. What does that mean for oil and gas?*, Jan. 14, 2022. In February 2020, for the Permian Basis alone, the amount of daily brine produced totaled about 160,000 barrels. See April Reese, SEARCHLIGHT NEW MEXICO, *Wastewater, wastewater everywhere: In the Permian Basin, a new kind of boom*, Feb. 3, 2020. Over time, as wells exhaust the mineral field reservoir, the wells begin to produce more brine and fewer recoverable minerals. Conventionally, operators choose to shut down, seal, or abandon a well when it is primarily producing brine with few recoverable minerals. Each year, thousands of wells are closed or shut in the state of Texas alone. Closed wells may be a source of hazardous and costly environmental contamination.

The present invention is directed to overcoming one or more of the existing problems with subterranean brine.

SUMMARY OF THE INVENTION

In one aspect of the present disclosure, a method of producing hydrocarbons includes obtaining a brine derived from a subterranean source containing hydrocarbon substances is disclosed. The method also includes delivering energy to the brine to energize and rearrange the intermolecular hydrogen bonds in the water molecules of said brine. The method further includes selecting a first and second borehole, each connected to a subterranean reservoir, wherein a liquid introduced into said first borehole will substantially flow through the reservoir to the second borehole. The method also includes introducing said brine into a subterranean reservoir. The method finally includes extracting a new hydrocarbon-enriched liquid from the second borehole and transporting it to the surface.

In another aspect of the present disclosure, a method for producing light alkanes includes selecting a stripper wellsite comprising at least two boreholes connected to a reservoir containing a latent liquid that is hydrocarbon poor is disclosed. The method further includes obtaining a wastewater brine containing kerogen, and also includes gravity feeding said brine into a first borehole. The method further includes delivering activation energy that is acoustic energy to said brine prior to feeding into a borehole. The method includes extracting a liquid from a second borehole, wherein said liquid contains a higher concentration of light alkanes than the latent liquid. The method finally includes transporting the liquid to the surface, and delivering acoustic energy to said liquid at the surface.

In yet another aspect of the present disclosure, a method of producing hydrocarbons includes extracting a pregnant brine derived from an oilfield source is disclosed. The method also includes delivering energy to the brine to rearrange the water molecules from a tetragonal orientation to a trigonal orientation. The method further includes introducing the brine into a geologic formation. The method finally includes extracting fluid from the geologic formation, wherein the fluid comprises brine and oil.

This has outlined certain features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
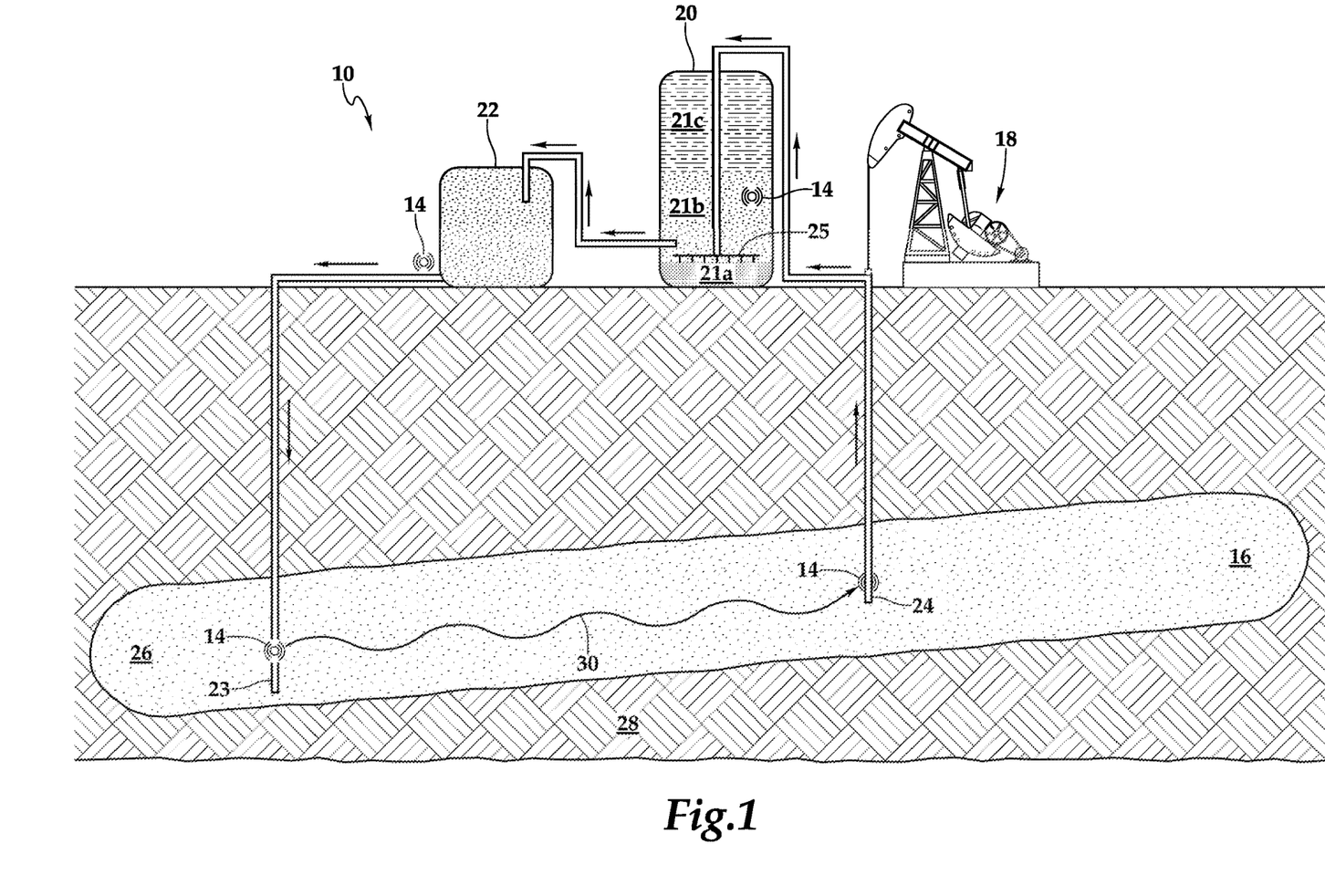
FIG. 1 shows an embodiment of a production system for producing hydrocarbons.

FIG. 1 shows an exemplary embodiment of a production system 10 for the treatment of brine and extraction of useful hydrocarbons. The location for the system 10 is chosen based on the availability of brine containing one or more hydrocarbons, and the availability of a suitable geologic reservoir 16. The system 10 utilizes at least one well, or other underground conduit, that is connected to a geologic reservoir 16. A well may be existing in the field already, or it may be purposefully drilled at a location based on the availability of brine and a suitable geologic reservoir 16. In other embodiments, the well may be a stripper well, or other type of well thought to be expired for the useful and commercially viable production of hydrocarbons. In certain embodiments of the system 10, the well will feed the brine (by gravity or pump injector) into the reservoir and the well pump 18 is used to remove oil, gas, and brine from the reservoir.

A suitable brine 22 is provided to the system, typically by the well operator. The brine 22 is selected based on the content of carbon-based substances that are involved in the geologic mechanism to form oil. Such minerals may be a precursor to the formation of oil, may be present at any point on the reaction chain, or may serve as other reactants, or as catalysts. For example, without limitation, such carbon-based substances may be minerals or chemicals, or categories of the same, such as kerogen, diamondoids, and aromatics. Typically, a suitable brine 22 will originate as an oilfield byproduct. The content of these brines depends on the specific oilfield or geologic formation from which it originated, the age of the well from which it originated, and any type of treatment that already occurred. Oilfield brines byproducts all over the world commonly contain salts and kerogen, as well as other carbon-based substances that are a precursor to the geologic formation of oil. Preferably, the brine will contain at least one carbon-based mineral that is involved in the geologic material to form oil. More preferably, the brine will contain a quantity of kerogen. Highly suitable brine contains a high quantity of kerogen, and a high quantity of other carbon-based substances involved in any of the chemical reactions known in the geologic formation of oil. In one embodiment, a suitable brine contains kerogen with a concentration of at least about 10 ppm. However, the concentration may be lower in other embodiments, especially if the brine contains other carbon substances. In another embodiment, the kerogen concentration is at least about 25 ppm. In still other embodiments, the kerogen concentration is at least about 30 ppm. In certain preferred embodiments, the kerogen contraction is around 100 ppm or greater. Other suitable, and preferred brines are even higher any may be around 200 ppm or greater, 300 ppm, or even greater. Oilfield brine containing any kerogen, notwithstanding any other carbon substances, is referred to as "pregnant" brine.

A suitable brine 22 may also be selected based on its saline content. A salt must contain a metal atom, and at least one other non-metal atom including a halogen atom. Accordingly, there are many different types of salts. Typically, natural brines contain more than one type of salt. Common natural salts in brines include magnesium chloride and sodium chloride. Brine originating from the oilfield, typically as a byproduct, usually contains a mixture of salts, with higher concentrations of more common salts such as magnesium chloride and sodium chloride. Preferred brine contains at least one salt in a range of concentrations from around 3% to around 15%. Certain suitable brines may contain a plurality of different metal halides.

Once a suitable brine 22 is obtained, the operator may introduce it into the well, such as by a gravity feed. Other embodiments may contemplate injection, or pumping of the brine into a well and reservoir. For introduction into the well other than a gravity feed, a piston-based pumpjack may be used, or any other known well-injection or well-pumping device. The well is installed, either before, or after injection of brine 22, with an energy source 14. In a typical embodiment, this energy source 14 is a tool as used in the oilfield service industry that causes energy to be delivered to a liquid. The energy source 14 may deliver energy to cause a measurable effect in the liquid. For example, a change in the substance is detectable by and through photonic spectroscopy, such as through an attenuated total reflectance instrument. In certain embodiments, an energized and rearranged brine may have a detectable wave number peak around 500 $cm^{-1}$, and around 3500 $cm^{-1}$. Other embodiments may yield an energized and rearranged brine having a wave number higher or lower than this. In a preferred embodiment using an energy source delivered by an oil field tool, the resulting wave number peaks through attenuated total reflectance absorption spectroscopy are about 512 $cm^{-1}$ and about 3519 $cm^{-1}$.

Other devices may be used to cause a mechanical vibration, or otherwise to create sound energy. The energy source 14 may be placed anywhere in the system 10, where there is a potential pressure contrast to interact with the brine 22. It also may be placed in many different places in the system 10. In a typical deployment of this method, at least one energy source 14 is placed in the system and down the well. There, it is close to, or in the geologic reservoir 16, and near to the entry point of the brine 22 into the geologic reservoir 16. An example of an energy source 14 that may be used and available commercially to practice the invention (but which is not required) is the Enercat tool. Other commercially available tools are also contemplated.

The energy source 14 is activated and operated while the piston pump is running and introducing brine to the geologic reservoir 16. In a typical deployment, where an acoustic tool is used, the activation and operation of the tool causes acoustic energy to interact with the pumped brine 22. The acoustic energy radiates from the energy source. However, the invention also contemplates that the energy is directional due to placement, operation, or added components. For acoustic energy, an operator may direct the energy by utilizing acoustically reflective substances or structures such as acoustic horns shaped as cones, megaphones, speaker cones, or other such structures known in the acoustic engineering art. The energy source 14 may be placed in multiple places in the system 10. In preferred embodiments, the tool is placed near the geologic reservoir 16 where the brine 22 is introduced by the pump. In preferred applications, the energy from the energy source 14 will travel into the reservoir 16 and may be detectable at multiple points throughout the reservoir, including but not necessarily at removal point 24 where liquid is extracted from the reservoir 16.

Hydrogen bonding is understood in chemistry as a weaker form of bonding that occurs between molecules. It is far weaker than the interatomic forces in common chemical bonds required for water and hydrocarbons, such as the intramolecular covalent bonds between hydrogen and oxygen, hydrogen and carbon, or between oxygen and carbon. However, hydrogen bonding can affect properties of substances, including reactivity, conductivity, and density. Hydrogen bonding, i.e., intermolecular, is common between hydrogen and oxygen, and thus occurs frequently between water molecules (where one molecule contains one hydrogen atom and two oxygen atoms).

Figure 3:
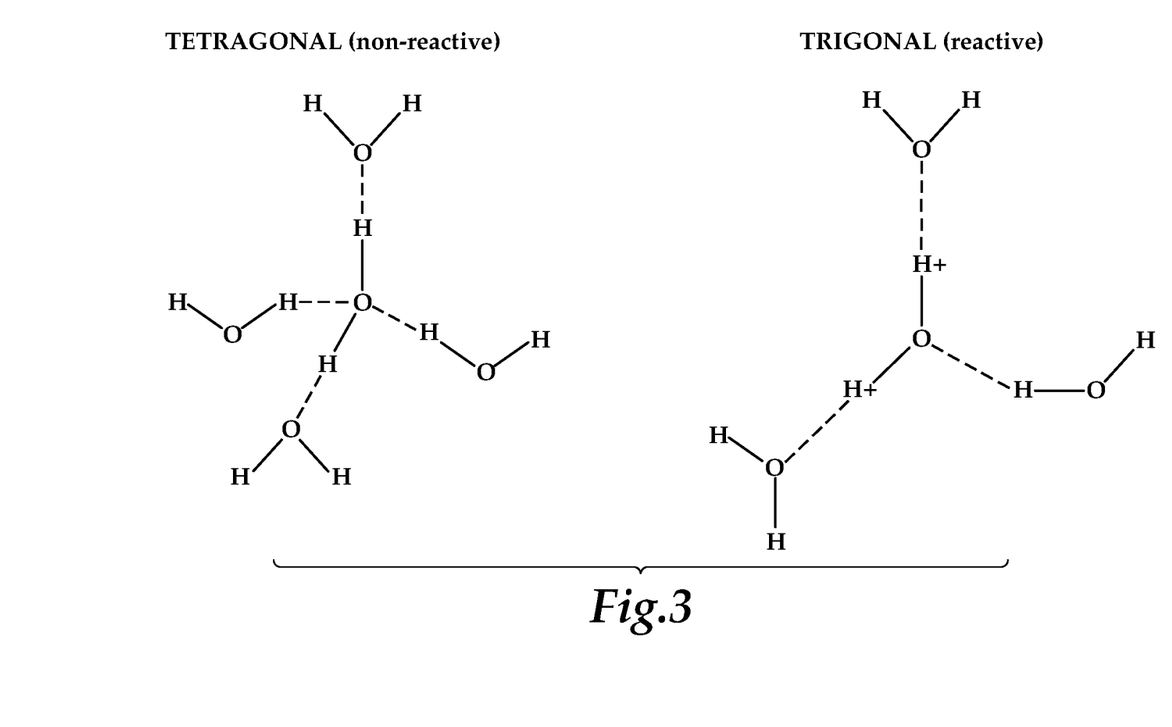
FIG. 3 shows the hydrogen bonding of water at standard temperature pressure (STP), and at STP after introduction of an energy source.

Normally, liquid water is oriented according to the hydrogen bonding between water molecules. At standard temperature and pressure, liquid water molecules are tightly bonded between the single hydrogen atom of one molecule, and one of the oxygen atoms in another molecule. Specifically, tetragonally coordinated hydrogen bonds are shorter and stronger, whereas, trigonally coordinated hydrogen bonds are longer and weaker. In effect, tetragonally coordinated non-energized water is more non-reactive, whereas, trigonally coordinated, sonically energized water is more reactive. FIG. 3 demonstrates tetragonally coordinated hydrogen bonding, as a result of the two covalent bonds and two hydrogen bonds, and also demonstrates trigonally coordinated hydrogen bonding having two covalent bonds and one hydrogen bond per oxygen. The level of hydrogen bonding in water can affect the density of the water, and its reactivity. As an example, as the temperature of water drops, the hydrogen bonding increases. In normal ice, the water molecules are organized in a tetragonally coordinated pattern according to hydrogen bonding between molecules. Frozen water is less dense than water at standard temperature pressure (STP) in part because of the strength of the hydrogen bonding. Additionally, reactivity of the water also increases with less hydrogen bonding between water molecules. As hydrogen bonding is weakened, such as in the trigonal orientation, the hydrogen on the water molecule is more available to react with a negatively charged kerogen. If the freed hydrogen in the water molecule contacts a non-water molecule it is more likely to react with that molecule. Accordingly, in an ionic solution with a negatively charged carbon substance (kerogen), a water molecule with fewer hydrogen bonds is more likely to react with a carbon atom, causing hydrogenation and alkane loaded oil generation from the water splitting that attends the reactions shown below.

(Reaction 1)

(Reaction 2)

In a typical embodiment of the system 10, the energy source 14 is an acoustic source causing cleavage of hydrogen bonding between water molecules in the brine 22. The cleavage causes the water molecules in the brine 22 to reorient into a higher energy, and more reactive state. In turn, the cleavage of the hydrogen bonding increases the reaction potential of the water molecules, specifically the speciation of the hydrogen atom, which becomes more ionic and potentially positively charged (acid). Since the cleavage occurs in the presence of substances containing carbon, i.e., the suitable brine 22, a water splitting reaction occurs (see reactions 1 and 2 above), among other reactions. This, in turn, causes a chemical reaction causing a significant portion of carbon in the kerogen to react into a variety of different liquid and gas hydrocarbons, and also residual byproducts. Certain resulting liquid hydrocarbons include a diverse range of alkanes: "light" alkanes between n-C10 to n-C15; slightly heavier alkanes that are still "light" between n-C16 to n-C19, including pristane and phytane; intermediate alkanes between n-C27 to n-C34; heavy alkanes between n-C35 to n-C44; and other types of alkanes. Certain resulting byproducts include carbon dioxide. A person of ordinary skill in the art would recognize that reaction chemistry can vary, in part due to the multiple different carbon-bearing substances in a typical brine solution. However, water splitting reactions will occur and are necessary to the generation of the components of liquid oil and gas, e.g., alkanes. See, e.g., Helgeson et al., 2009, FIG. 1.

In a typical embodiment of the system, the brine 22 is introduced into the well including by gravity feed, pump, or other well feeding device, which will feed the brine into the geologic reservoir 16 (or other wells that are used to feed the brine) at a penetration point 23. When the brine 22 reaches downhole, the acoustic energy source 14 will interact with the brine 22 near its entrance to the reservoir 16. Preferably, the well/pump pressure is sufficiently high to cause the brine 22 to flow. In FIG. 1, the brine 22 is shown to flow through the reservoir 16 in one general direction based on geologic characteristics of the reservoir 16. Generally, maximizing the flow rate is preferred by continuously feeding the reservoir with brine, which creates more kinetic energy into the brine 22, which can cause the flow rate to increase. An increased flow rate is preferential because it ultimately makes a gravity driven fractionation of the light oil/gas component from the heavy oil component. This may improve the production output, and otherwise improve reaction and production yields.

The embodiment in FIG. 1 shows that the brine 22 is flowing through the reservoir 16 to a second well location and well pump 18. This well also includes a well pump, which is used to remove liquid from the geologic reservoir 16 at a removal point 24. The feeding point 23 and the removal point 24 are typically in the same reservoir 16. However, because of the variability and definitions of where a particular reservoir 16 may begin or may end, the points 23, 24 may be in different reservoirs. Additionally, the points 23, 24 may or may not be in the same geologic formation. Once the well pump 18 removes the liquid from the reservoir 16, it is transported to a surface station 20 for processing. The surface station 20 includes equipment known in the art for the onsite processing subterranean hydrocarbon-laden liquids. For example, the station 20 typically includes a density separation device, or separator 25, and would include a gun barrel and oil tank for produced oil. In the embodiment of FIG. 1, the gun barrel depicted in the station 20 shows a separation of substances comprising a layer of highly viscous sludge 21a, a layer of brine 21b, and a layer of oil 21c, commonly referred to as an "oil pad." The layer separation may be enhanced by the placement of an acoustic tool in the gun barrel.

The geologic reservoir 16 is selected for its availability of a permeable or semi-permeable formation that permits a gravity fed brine 22 to flow and be received at another location in the reservoir 16, such as at the removal point 24 of liquid uptake from the production well pump 18. The reservoir must be sufficiently large to receive a quantity of brine 22 that is greater than about 80% of the original reservoir brine production. In preferred deployments, the size of the reservoir 16 is at least 100 ft., and may range up to the size of an entire oil field. In some embodiments, the general scenario is that the flow will be up dip/structure from the feeder well in a given oil field. In the embodiment in FIG. 1, natural barriers 26 and 28 in the geologic reservoir 16 substantially prevent loss of brine 22. Preferably, within the reservoir, there should at least one formation 30 that is permeable or semi-permeable. The at least one formation 30 should not contain mineral cements or geologic barriers that would substantially impede the flow of brine or cause it to lose kinetic energy. Further, the at least one formation 30 should not include mineral cements, or geologic barriers, that would substantially impede the distribution of the energy source, or prematurely react with the brine prior to the oil generation reaction which occurs after the depressurization at the feeding point. Such minerals or substances adverse to geologic oil generation may include all anhydrous non-carbon materials. Such minerals or substances may be in the reservoir 16 or formation 30, but should not be present in substantial quantities understood by those of skill in the art to be adverse to geologic oil generation. Preferably, the geology of the reservoir 16 is configured to permit gravity-driven, or flow-driven separation of fluids. Preferably, the reservoir 16 and any formation(s) 30 included within it the brine/hydrocarbon/authigenic minerals in the existing reservoir, may naturally contain substances contained in a suitable brine 22, e.g., kerogen and other carbon-based substances involved in the geologic generation of oil from either the brine or existing hydrocarbon materials in the reservoir.

Figure 2:
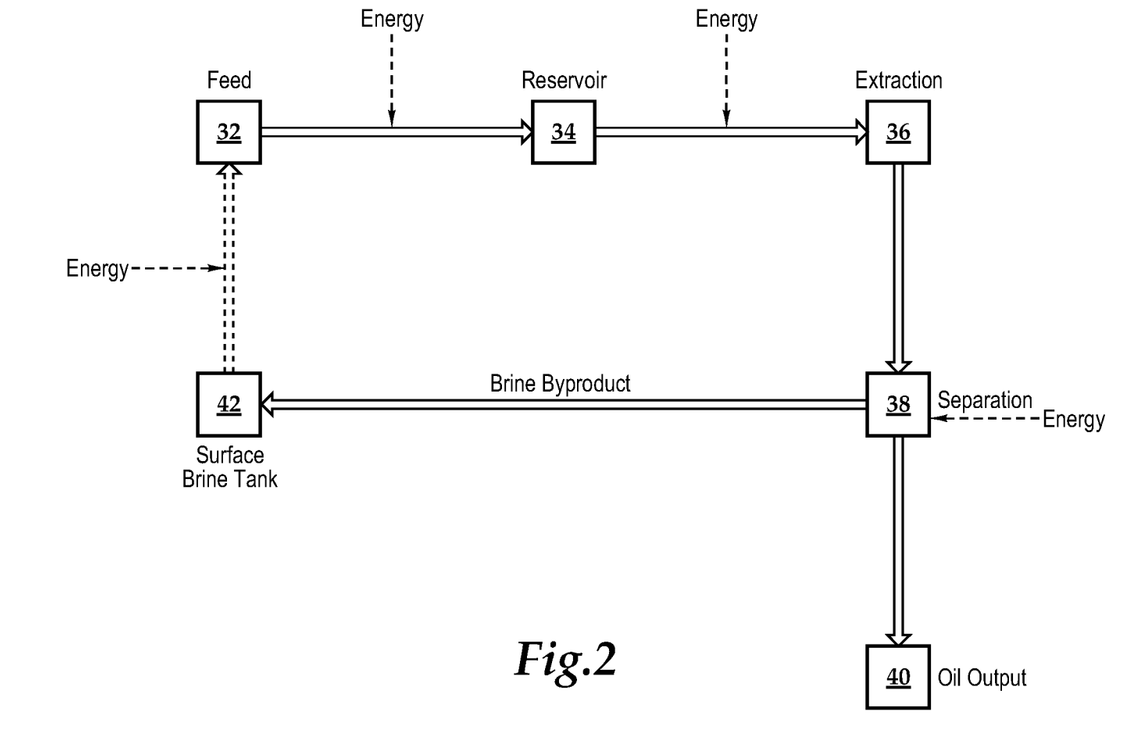
FIG. 2 shows a process flowchart of an exemplary production system.

FIG. 2 depicts an embodiment of the invention showing a system and process for the production of hydrocarbons. Brine containing at least one carbon substance, and preferably containing kerogen, may be introduced into a borehole by the feed 32. The brine will then flow, be injected into, or gravity fed beneath the ground and typically to a reservoir 34, or a geologic formation or porous subterranean material. Once the brine is present within the reservoir, it may flow through the reservoir, or formation, or porous material to a second borehole. At this point, liquid is extracted from the borehole. After extraction from the reservoir, the liquid is typically transferred above ground where it will be separated into constituent parts 38, which would include a quantity of hydrocarbons. The quantity of hydrocarbons includes alkanes, and specifically would include light alkanes. Following separation into constituent parts 38, oil output 40 is obtained containing useful hydrocarbons. Additional products of the separation will include byproducts, which further include a brine byproduct. The brine byproduct may contain a quantity of hydrocarbons, including unreacted or partially reacted hydrocarbons.

The two boreholes may be around 600 feet apart, or less. In other embodiments, the boreholes may be greater than 600 feet apart. In still other embodiments, the boreholes may be over 1000 feet apart. In still other embodiments, the boreholes may be 2000 or more feet apart. In additional embodiments, the boreholes may be one mile or more apart. In certain embodiments, the boreholes will be connected to the same subterranean porous material, reservoir, or geologic formation even if a plurality of miles apart.

In a typical embodiment, brine byproduct is transported to a surface brine tank 42. In some embodiments, the brine byproduct is held in the tank 42 or transported to a further location, including removal or disposal from the wellsite. Optionally, the brine in the tank 42 may be transported back to the feed location 32. This permits any unreacted or partially reacted hydrocarbons in the brine, including kerogen, to travel again through the reservoir 34 or other formation or subterranean material to further complete the reaction into useful hydrocarbons, and resulting oil output 40.

At one or more points in this process, energy may be added to the system to reach the brine as demonstrated in FIG. 2. The figure depicts a plurality of locations that energy may be added in embodiments of the invention, for example between the feed 32 and the reservoir 34, between the reservoir 34 and the extraction point 36, and between the surface brine tank 42 and the feed 32. Energy may also be added at other stages in the process, including to the brine byproduct, to the oil output, and inside or near to components such as the borehole casing, pipes, and the extraction and separation equipment. The energy reaching the brine will cause water molecules to energize. In turn, this energy will affect, or otherwise change the orientation of the water in the brine from its normal state to an energized state. In typical embodiments, the change in orientation is from a water molecule's tetragonal orientation to a water molecule's trigonal orientation. In preferred embodiments, energy is introduced into the process or system at or near changes in the flow of the brine, including without limitation at exit or entry points to a formation, a casing, a unit operation, a pump, or at a tank.

Typically, energy may be from a tool, such as an acoustic or other energy delivery type of tool. In other embodiments, the tool provides a reaction facilitation function, such as a catalytic effect. However, energy added to the system may also be from other sources such as the latent chemical energy, pH level of the brine, or from any latent pH of any material in the reservoir. Additionally, latent geologic substances may also cause a catalytic effect to facilitate reactions. The latent geologic substances introducing a catalytic effect can include, without limitation, iron, magnesium, vanadium, and platinoids. Latent geologic substances that may introduce energy, or cause a catalytic effect may also include authigenic minerals, including without limitation, quartz, carbonates, and clays. Quartz and clays present in either the tool or the formation may introduce energy or cause a catalytic effect by and through piezoelectric properties, and may include other substances known to have piezoelectric properties. Energy added to the system may also be in the form of thermal or kinetic energy, which can be created by the conversion of a variety of types of potential energy, including by and through chemical reactions, pumps, and heat sources. More than one type of energy may be added to the process or system at any given point.

EXAMPLE

The production system was tested in a Texas stripper well array, i.e., a set of wells exhausted after years of production so that conventional operators cannot make a profitable extraction of hydrocarbons. In this particular well array, the brine content from extraction was costly to process, and what little oil could be removed was not profitable on current or expected market prices. The suitable brine 22 for the test originated as wastewater from a different region of Texas, and was delivered as wastewater by truck to the stripper array. The brine contained dissolved kerogen, as well as other carbon-bearing substances. In particular, the brine contained kerogen at a concentration of 280 ppm. The brine was loaded into a brine tank, with an (acoustic) energy source 14 in line between the brine tank and the feeder well. The feeder well gravity delivered the brine into the reservoir. Another energy source 14 was located within the well between the surface and the reservoir 16, and an additional energy source 14 was located at the penetration point. The brine flowed through the well, into and through the permeable formation of the reservoir, and to the extraction point from the production well. Another energy source 14 was located at the extraction point downhole. The production well pump 18 extracted the contents of the reservoir 16, and delivered them to a surface-level station 20 including a gun barrel, where another energy source 14 was located. The gun barrel separated the contents of the production stream permitting the oil to float to the top where it was transported to an oil tank.

Figure 4:
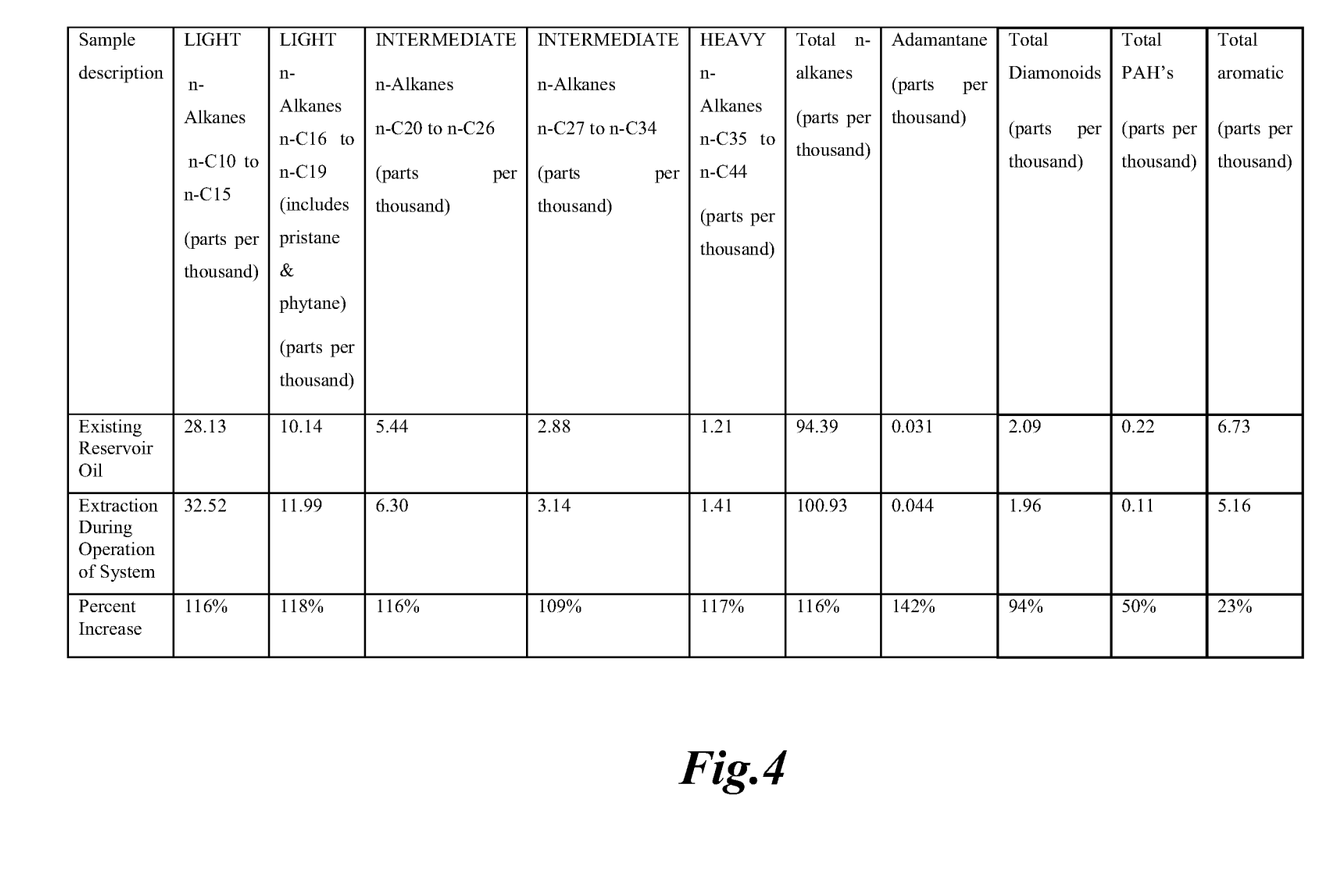
FIG. 4 shows data from an exemplary system.

FIG. 4 shows data from an embodiment of the production system 10 in practice at the stripper array. The samples of conventional liquid hydrocarbons from the existing (exhausted) stripper well were taken prior to adding brine to the system, and prior to activating the injection pump and the acoustic energy source 14. After chemical analysis, the existing reservoir oil sample surprisingly shows the following concentrations of alkanes: 28.13 parts per thousand for n-C10 to n-C15 alkanes, and 10.14 parts per thousand for n-C16 to n-C19 alkanes, which include both pristine and phytane. The total n-Alkanes amounted to 94.39 parts per thousand. Additionally, the adamantane level amounted to 0.031 parts per thousand.

Samples were additionally taken following the introduction of brine, and activation of the energy sources, and the extraction pumps. After chemical analysis, the new production circuit samples show the following concentrations of alkanes: 32.52 parts per thousand for n-C10 to n-C15 alkanes, and 11.99 parts per thousand for n-C16 to n-C19 alkanes, which include both pristine and phytane. The total n-Alkanes amounted to 100.93 parts per thousand. Additionally, the adamantane level amounted to 0.044 parts per thousand. The difference in figures from the existing reservoir to post-production system would be understood to be significant to a person of ordinary skill in the art. Further, such a person would not have expected these levels for well samples given the previous readings (which had been consistent with a stripper well). Such a person would also not have expected those levels knowing that a waste brine had been added to the system, because the brine had already been processed to remove valuable hydrocarbons such as alkanes.

Surprisingly, the adamantane concentration increased by a very significant concentration level of approximately 42%. Dissolved kerogen may cause adamantoids to become present in a brine solution, especially after exposure to high energy state water with reduced hydrogen bonds. The adamantoids then further react with the water to dealkylate and rearrange into adamantane. Thus, while the rest of the adamantoids decrease in quantity, the adamantane quantity increases. Adamantane is known to provide an effective platform for new alkylation. These new alkyl chains get bigger and bigger and cleave away to make oil, mediated by the heavy water and continued reaction potential of hydrogenation. This reaction is far more likely to reduce with "light," alkanes, particularly those under n-C15. An additional effect of the reaction mechanisms of hydrogenation was that existing diamantanes in the reservoir were also reacted in a similar hydrogenation pathway, and decreased in quantity. This is shown by the data in FIG. 4.

Additionally, it was found that using the tool, but without any introduction of kinetic energy and without the introduction of a new brine with a higher concentration of kerogen, the production of hydrocarbons was measurably lower. In particular, using sonic energy but without kinetic energy and only with a latent brine showed less reactance of polycyclic aromatic hydrocarbons (PAHs) and total aromatics amounting to a decrease of 12.8% for total PAHs and a decrease of 15.8% for total aromatics. This resulted in a lower yield of useful hydrocarbons such as alkanes as compared to using the tool with the kinetic energy. Specifically, with only the tool and the latent brine, the yield amounted to a light alkane concentration (n-C10 to n-C15) of around 31.04 parts per thousand, and a lower total alkane concentration comparatively. Intermediate (n-C20 to n-C26, and n-C27 to n-C34), and heavy alkane production was lower too: 6.16 parts per thousand, 2.98 parts per thousand, and 1.31 parts per thousand respectively. These lower yields for useful hydrocarbons are in contrast to the significant increased production shown in FIG. 4, showing data utilizing kinetic energy and the tool. FIG. 4 also demonstrates a decrease in the reactance of total PAHs of 50%, and a decrease of 23% for total aromatics. In turn, these decreases reflected in FIG. 4 resulted in a greater increase of useful hydrocarbons such as alkanes.

Figure 5:
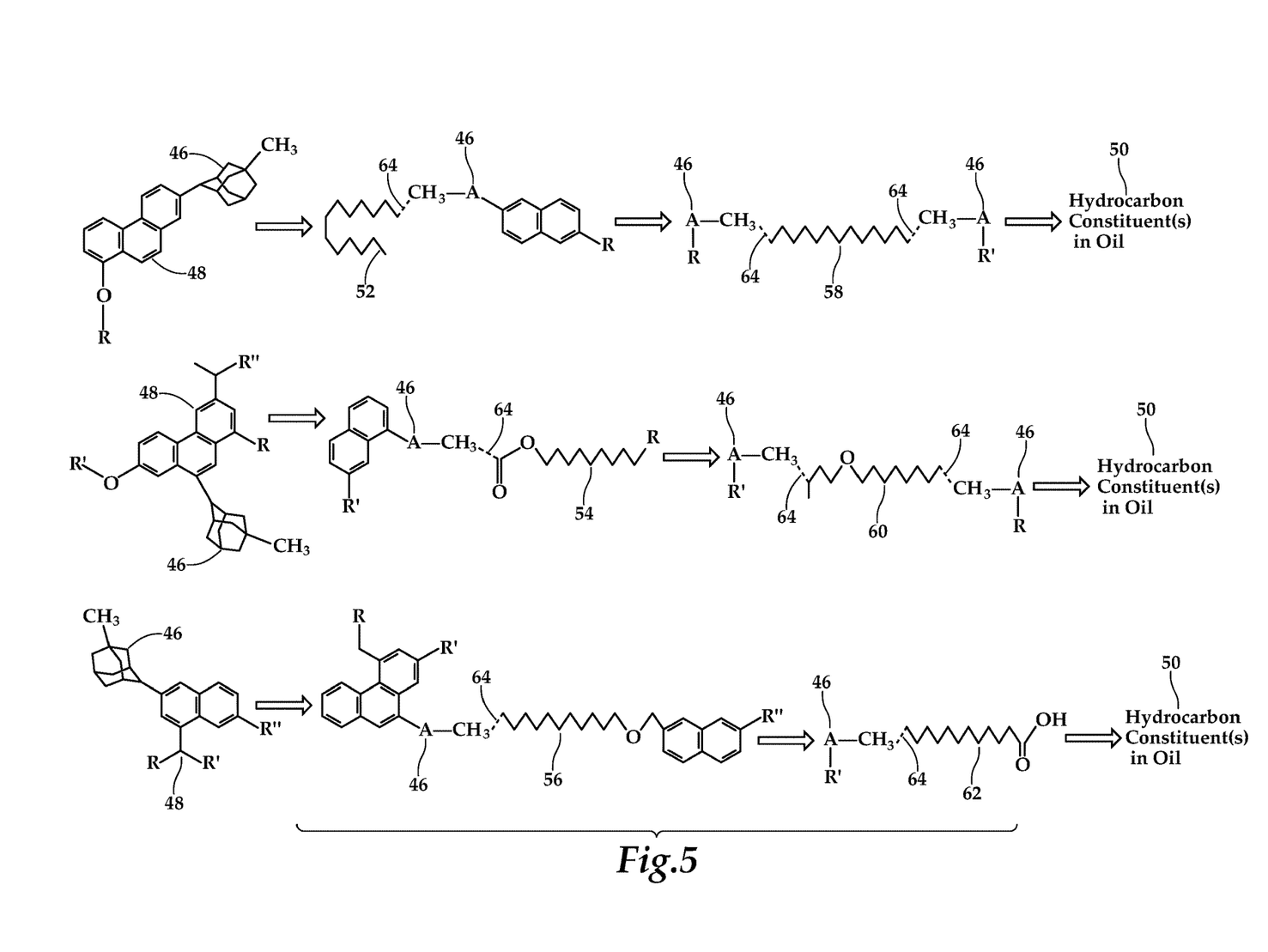
FIG. 5 shows the formation of diamondoids at hydrogenated rearranged polycyclic aromatic hydrocarbon (PAH) sites in kerogen, which then act as molecular building blocks for alkane chains which are subsequently cleaved off as liquid state oil.

An embodiment of this process, which is consistent with the data in FIG. 4, is depicted in FIG. 5 showing the formation of new hydrocarbon constituents of oil, such as new alkyl chains. FIG. 5 shows an embodiment where diamondoids form at hydrogenated rearranged polyaromatic hydrocarbon sites in kerogen 48. The kerogen 48 is depicted in FIG. 5 as part of an initial hydrocarbon reactant in the embodiments and is shown containing certain polyaromatic rings. The diamondoids form may be more likely to form at napthaline and phenanthrene sites on the kerogen. The formed diamondoids, and as depicted in FIG. 5, adamantane 46, act as molecular building blocks for hydrocarbon chains, including alkanes.

The figure shows steps in the formation of hydrocarbon chains 52, 54, 56, 58, 60, 62 before cleavage. Certain of the chains forming may be alkanes. The dashed lines between the methyl group on the adamantane 46, and the beginning of the chains 52, 54, 56, 58, 60, 62 depicts a weaker bond 64, such as in connection with a Van der Waals force. These chains 52, 54, 56, 58, 60, 62, or portions thereof, are subsequently cleaved off, including at the location of the weaker bond 64. This cleavage results in the production of alkanes and other hydrocarbon constituents 50 typically found in crude oil. Additional data showed extra carbon dioxide and other gases from the extraction pump at higher levels than previously seen. This is demonstrated by reaction 1 and 2 above. This is a byproduct of the hydrogenation reaction pathway from kerogen to alkanes. An embodied process demonstrated in part by FIG. 5 may also be referred to as alkylation.

Preferably, it was found that energy sources should be located in multiple parts of the system to maximize a heightened energy state of the water contained in the brine. Additionally, an energy source should be located at the gun barrel to facilitate the completed reaction of any final kerogen, or intermediary reactants, into oil. More preferably, kinetic energy and a more pregnant brine should be introduced to the process and system by and through pumps, gravity feeding, and/or the orientation of the geology causing flow within the formation.

The invention claimed is:

1. A method of producing hydrocarbons, comprising:
    obtaining a brine derived from a subterranean source containing hydrocarbon substances, wherein the hydrocarbon substances comprise kerogen;
    delivering energy to the brine to energize and rearrange the intermolecular hydrogen bonds in the water molecules of said brine;
    selecting a first and second borehole, each connected to a subterranean reservoir, wherein a liquid introduced into said first borehole will substantially flow through the reservoir to the second borehole;
    introducing said brine into a subterranean reservoir; and
    extracting a new hydrocarbon-enriched liquid from the second borehole and transporting it to the surface, wherein the hydrocarbon-enriched liquid comprises alkanes.

2. The method of claim 1, wherein the energy delivered causes measurable acoustic vibrations, and the brine flows through said reservoir.

3. The method of claim 2, wherein the brine after rearrangement of the bonds has wave number peaks at around 512 $cm^{-1}$ and at around 3519 $cm^{-1}$ as measured by an attenuated total reflectance absorption spectra.

4. The method of claim 2, further comprising:
delivering acoustic energy to the brine prior to introduction of the brine into the subterranean reservoir, and while the brine is in the subterranean reservoir; and
delivering acoustic energy to the hydrocarbon-enriched liquid in or near the connection between the second borehole with the reservoir, and additionally at or near the surface.

5. The method of claim 1, wherein the subterranean source is an oilfield reservoir producing wastewater brine.

6. The method of claim 1, wherein the boreholes are about 600 feet apart or less.

7. The method of claim 1, wherein the boreholes are greater than about 600 feet apart.

8. A method for producing light alkanes, comprising:
selecting a stripper wellsite comprising at least two boreholes connected to reservoir containing a latent liquid that is hydrocarbon poor;
obtaining a wastewater brine containing kerogen;
gravity feeding said brine into a first borehole;
delivering activation energy that is acoustic energy to said brine prior to feeding into a borehole, wherein the acoustic energy causes the water molecules in the brine to rearrange the intermolecular hydrogen bonds in the water molecules of said brine;
extracting a liquid from a second borehole, wherein said liquid contains a higher concentration of light alkanes than the latent liquid; and
transporting the liquid to the surface, and delivering acoustic energy to said liquid at the surface.

9. The method of claim 8, wherein the latent liquid contains a concentration of adamantane diamondoid, and the extracted liquid contains a concentration of adamantane diamondoids that is at least 25% higher.

10. The method of claim 8, wherein the brine contains more than one type of metal-halide substance, including at least one metal comprising sodium, magnesium or potassium, and at least one halide comprising bromine or chlorine.

11. The method of claim 8, wherein the brine contains kerogen in a concentration of no less than about 30 ppm.

12. The method of claim 8, wherein the liquid contains a significantly higher concentration of total alkanes than the latent liquid.

13. The method of claim 8, wherein the water molecules in the brine rearrange from a tetragonal to a trigonal orientation.

14. A method of producing hydrocarbons, comprising:
extracting a pregnant brine derived from an oilfield source;
delivering energy to the brine to rearrange the water molecules from a tetragonal orientation to a trigonal orientation;
introducing the brine into a geologic formation; and
extracting fluid comprising a quantity of alkanes from the geologic formation, wherein the fluid comprises brine and oil.

15. The method of claim 14, wherein the extracted fluid contains constituents of crude oil.

16. The method of claim 14, wherein the quantity of alkanes is greater than that previously present in the formation.

17. The method of claim 16, wherein the extracted fluid contains a concentration of adamantane diamondoid, and the content of adamantane diamondoids in the extracted fluid is greater than that previously present in the brine or in the geological formation.

18. The method of claim 14, wherein the extracted fluid contains a higher quantity of light alkanes compared to that previously present in the geologic formation.

\* \* \* \* \*